United States Patent

[11] 3,584,898

| [72] | Inventors | Arthur B. Pearson<br>Orchard Lake;<br>Henry T. Mitchell, Royal Oak, both of, Mich. |
|---|---|---|
| [21] | Appl. No. | 874,821 |
| [22] | Filed | Nov. 7, 1969 |
| [45] | Patented | June 15, 1971 |
| [73] | Assignee | General Motors Corporation<br>Detroit, Mich. |

[54] FENDER SHIELD ASSEMBLY
3 Claims, 5 Drawing Figs.
[52] U.S. Cl. ............................................. 280/153R
[51] Int. Cl. ...................................................... B62d 25/16
[50] Field of Search.......................................... 280/153 R,
153.5, 154; 49/261, 465; 16/171

[56] References Cited
UNITED STATES PATENTS

| 2,226,894 | 12/1940 | Buchanan................ | 280/153R |
| 2,273,523 | 2/1942 | Tandus...................... | 280/153R |
| 2,312,536 | 3/1943 | Fergueson................. | 280/153R |

*Primary Examiner*—Benjamin Hersh
*Assistant Examiner*—Robert R. Song
*Attorneys*—W. E. Finken and D. L. Ellis ABSTRACT: A fender shield assembly for closing a portion of a wheel access opening in the quarter panel member of a vehicle body includes a pair of mounting elements on the panel member, a shield member and a pair of support brackets fixedly secured to the shield member. The support brackets engage the mounting elements to support the shield member on the panel member in a normal or relaxed position tilted out of the plane of the opening and the mounting elements constrain portions of the support brackets during forcible rotation of the shield member into the plane of the access opening so that a tight rattle-free connection results therebetween and the shield member is biased toward relaxed position.

PATENTED JUN 15 1971

3,584,898

INVENTORS
Arthur B. Pearson &
Henry T. Mitchell
BY D. L. Ellis
ATTORNEY

FENDER SHIELD ASSEMBLY

This invention relates generally to vehicle bodies and in particular to fender shield assemblies therein.

One feature of this invention is that it provides an improved fender shield assembly. Another feature of this invention is that it provides an improved fender shield assembly including a plurality of support brackets, mounting elements and constraint means mounted on the shield member and a body panel member and interengageable to support the shield member on the panel member and to provide an axis for forcibly pivoting the shield member into the plane of the panel member so as to impart force couples to portions of the support brackets and thereby provide a tight rattle-free connection therebetween through rotational bias on the shield member. Yet another feature of this invention resides in the provision on each support bracket of longitudinally extending projection which engages the corresponding mounting element to vertically support the shield member on the panel member and which projections are engaged at spaced locations thereon by the constraint means during forcible rotation of the shield member so that the projections press tightly against the constraint means to provide a rattle-free connection therebetween and impart a rotation bias to the shield member. Still another feature of this invention is that it provides a fender shield assembly wherein the mounting elements each include an open ended slot, the closed end of which forms a mounting surface engageable by a support bracket projection to vertically position and support the shield member on the panel member and the two sides of which form the constraint means each of which sides engages the projection at a separate and distinct location thereon during forcible rotation of the shield member which rotation presses the projections tightly against the slot sides to provide a rattle-free connection therebetween and imparts a rotational bias on the shield member.

These and other features of this invention will be readily apparent from the following specification and from the drawings wherein.

Figure 1:
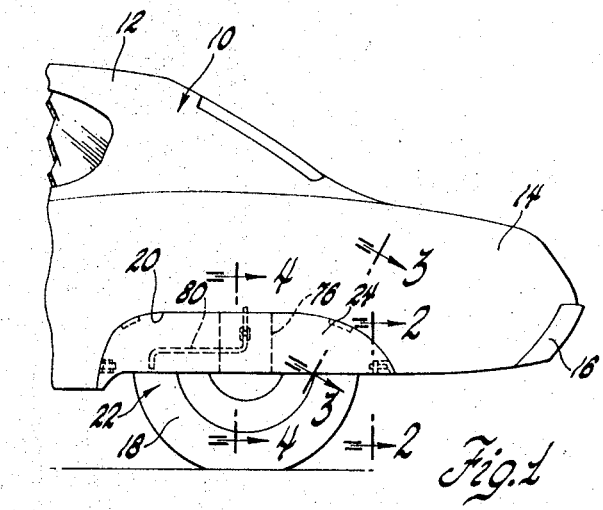
FIG. 1 is a side elevational view of the rear quarter of a automobile-type vehicle body including a fender shield assembly according to this invention.

Referring now to FIG. 1 of the drawings, an automobile-type vehicle body 10 includes a top assembly 12, a pair of rear quarter panel members, of which only one panel member 14 is shown, and a rear bumper structure 16 extending across the rear portion of the vehicle body. The body 10 is conventionally suspended above four wheel and tire assemblies, of which only rear wheel and tire assembly 18 is shown. A conventional wheel access opening 20 is provided in panel member 14 and a fender shield assembly according to this invention and generally designated 22 is provided to close the access opening and maintain continuity of appearance thereacross.

Figure 2:
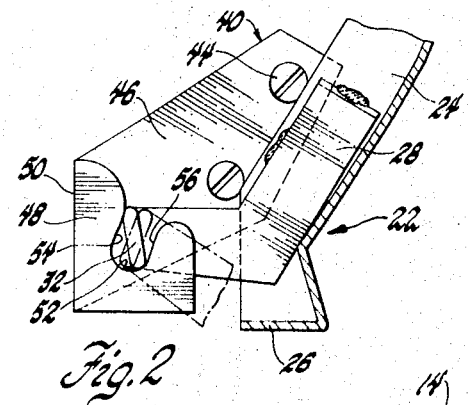
FIG. 2 is an enlarged sectional view taken generally along the plane indicated by lines 2–2 in FIG. 1.
Figure 5:
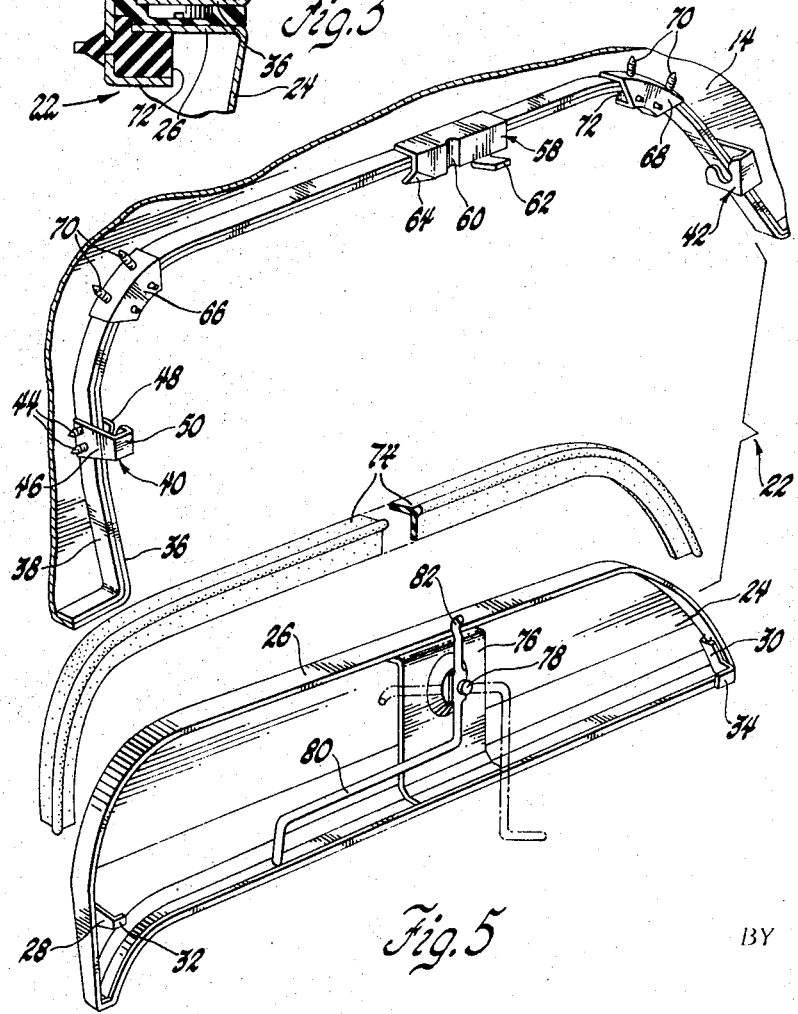
FIG. 5 is an exploded perspective view of a fender shield assembly according to this invention as viewed from behind the assembly.

Referring more particularly now to FIGS. 2 and 5, fender shield assembly 22 includes a shield member 24 having an inturned flange 26 extending around the entire marginal edge thereof. Shield member 24 has a configuration generally corresponding to that of access opening 20 and a cross section curvature, seen best in FIG. 4, generally similar to that of panel member 14 in the area adjacent access opening 20. A pair of support brackets 28 and 30 are fixedly secured to the shield member, as by welding, and include respective longitudinally extending projections 32 and 34 in the form of flanges aligned on a longitudinal axis of the shield member. An inturned flange 36 of quarter panel member 14 extends around the access opening 20 and has welded thereto a similarly shaped flange 38 of the usual wheelhouse structure, not shown. A pair of mounting elements 40 and 42 are fixedly secured to the welded flanges 36 and 38 at each longitudinal end of the access opening by conventional means such as screws 44 and are aligned on a generally horizontal axis of the vehicle body extending across the access opening. The mounting elements 40 and 42 are identical except for reversal of features to facilitate placement at each end of the access opening and element 40 only will be described in detail. The mounting element 40 includes a base portion 46 secured to panel member 14, an outer flange portion 48 oriented in a generally vertical plane extending perpendicularly to the plane of access opening 20 and a web portion 50 interconnecting the two. Flange portion 48 further includes a slot open at one end thereof and having a closed end or support surface 52 and two sides 54 and 56.

The support bracket and mounting elements cooperate and function to provide a tight rattle-free connection between a portion of the shield member and the panel member and to bias the shield member out of the access opening. More particularly, the projections 32 and 34 are received within the slots in mounting elements 40 and 42 respectively with their lower edges resting on the respective support surfaces as at 52 defined by the slots. Thus vertically positioned on the panel member, the shield member assumes normal or relaxed position, indicated by the broken lines position of flange 32 shown in FIG. 2, tilted outwardly relative to the access opening and determined by the angular orientation of the slots in elements 40 and 42. From the relaxed position the shield member and support brackets are rotatable as a unit relative to the mounting elements toward a fully closed position wherein the shield member assumes a generally coplanar relationship with the panel member 14 in the access opening. Due to the thickness of the projections 32 and 34 relative to the width of the slots, FIG. 2, such relative rotation is free until portions of the projections are captured by the sides of the respective slots. As best seen in FIG. 2, the upper edge of projection 32 engage slot side 54 while the lower edge thereof engages slot side 56 so that further substantial rotation of the captured portion thereof is effectively prevented. The same is true of projection 34.

Following capture of the projections, it is apparent that movement of the shield member toward fully closed position will be resisted by force couples developed on the projections at locations thereon where contact is made with the slot sides. The magnitude of the force couple increases as the shield member approaches fully closed position until in that position each edge of the projection is very tightly pressed against a side of the respective slot so that relative movement between the two is prevented and a rattle-free connection is achieved therebetween and between the panel member and the lower edge of the shield member.

The force couples on the projections are balanced on the shield member by an externally applied force urging the shield member into fully closed position. Between the captured portion of the projections and the location on the shield where the external force is applied, elastic deformation occurs to accommodate the rotation of the shield member relative to the non-rotatable captured portions of the projections. In particular, referring to FIG. 2, the captured distal end of projection 32 remains virtually stationary as the shield member and attached support brackets 28 and 30 are rotated toward fully closed position. The thickness of the projections is predetermined to permit torsional flexure thereof between the captured distal ends and the ends joined to the brackets so that in the fully closed position of the shield member the projections function as torsional springs urging or biasing the shield member out of the access opening.

In a modified embodiment, not shown, the projections 32 and 34 may be made torsionally inflexible relative to the shield member so that deformation of the shield member in the form of elastic beams bending occurs to accommodate rotation of the shield member relative to the nonrotatable captured projections. Having achieved fully closed position, the shield member then functions as a cantilever spring with the lower portion thereof fixed to the panel member at the mounting elements 40 and 42 so that the upper portion thereof tends to spring out of the access opening upon release thereof.

Figure 3:
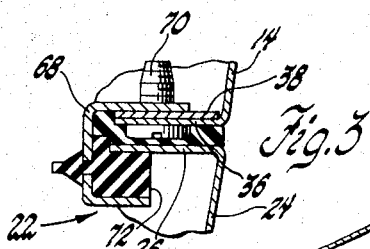
FIG. 3 is an enlarged sectional view taken generally along the plane indicated by lines 3–3 in FIG. 1.
Figure 4:
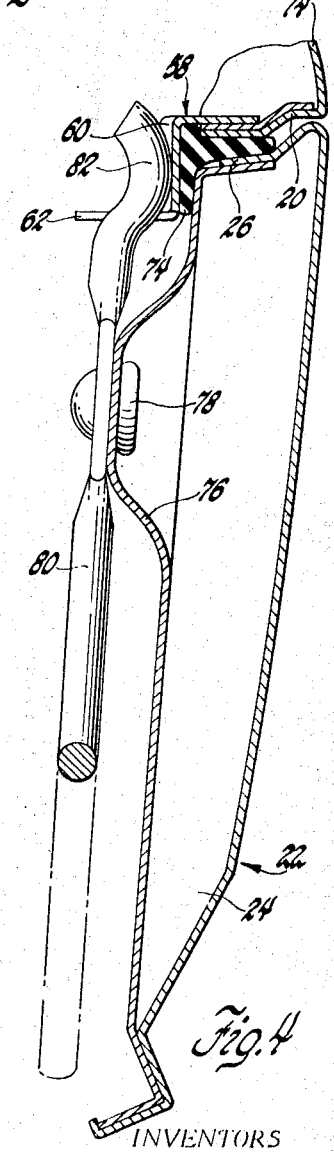
FIG. 4 is an enlarged sectional view taken generally along the plane indicated by lines 4–4 in FIG. 1.

Referring now to FIGS. 3, 4 and 5 in description of the remainder of the fender shield assembly, a cam plate 58 including a detent notch 60, a stop 62 and a cam surface 64 is fixedly secured to flanges 36 and 38, as by welding, generally at the center of access opening 20. A pair of bumper brackets 66 and 68 are secured to flanges 36 and 38 by screws 70 and have mounted therein rubber bumpers, of which only bumper 72 is shown. A seal member 74 fabricated from an elastic material such as rubber mounts between the panel member 14 and shield member 24 in the installed position thereof. A web member 76 is welded or otherwise fixedly secured to the shield member 24 between portions of flange 26 and has a pivot stud 78 secured thereto generally centrally of the shield panel 24. A generally L-shaped latch arm 80 with a detent 82 thereon is pivotally mounted on stud 78 for movement in a plane generally parallel to the shield member 24 between unlatched and latched positions.

In a typical installation sequence, the lower edge of the shield member 24 is brought into access opening 20 above mounting elements 40 and 42 and projections 32 and 34 are lowered into the slots therein to vertically support the shield member on the panel member in the relaxed position thereof. The shield member is then forcibly rotated against the aforementioned force couples up into the access opening of the panel member 14 to the fully closed position with seal member 74 therebetween, whereupon latch arm 80 is pivoted from the unlatched position, shown in broken lines in FIG. 5, to the latched position, shown in solid lines in FIG. 5. During such pivotal movement, detent 82 initially contacts cam surface 64 and is guided thereby into engagement with detent notch 60. The detent is maintained in the notch 60 by the bias on the shield member toward the relaxed position. Stop 62 functions to prevent overtravel of the detent 82 during latch movement of latch arm 80 and to prevent pivotal movement of the latch arm in the wrong direction when it is desired to remove shield panel 24 from the access opening. The rubber bumpers, in the fully closed position of the shield member, engage portions of in-turned flange 26 thereon, FIG. 3, to positionally stabilize the shield panel and damp vibrations of the upper portion thereof occurring during movement of the vehicle.

To remove the shield panel, the latch arm 80 is pivoted from latched to unlatched position thereof. As the detent 82 disengages from cam plate 58 the bias on the shield member 24 forces the upper portion thereof out of the access opening to bring the shield member to the relaxed position thereof whereupon the latter member may be readily removed from the access opening.

Having thus described the invention what we claim is:

1. In a vehicle having a body panel member with a wheel access opening therein, means for removably mounting a shield member on said panel member for closure of said access opening comprising a pair of support brackets each fixedly secured to a first of said members adjacent a respective edge portion thereof corresponding to a longitudinal end of said access opening and aligned on an axis of said first member, each of said brackets having a projection extending longitudinally of said first member; a pair of mounting elements each fixedly secured to the other of said members adjacent respective edge portions thereof corresponding to longitudinal ends of said access openings and defining a support surface, each of said support brackets engageable with a respective one of said mounting elements on said support surface thereof to vertically position said shield member on said panel member for pivotal movement between a relaxed or tilted position relative to said access opening and a fully closed position in said access opening for closure thereof, constraint means on said other member engageable with each of said projections at spaced locations thereon to prevent free relative pivotal movement between said projections and said constraint means during movement of said shield member to said fully closed position, forced pivotal movement of said shield member into said fully closed position being operative to provide a rattle-free support connection between said mounting elements and said support brackets and to impart a bias on said shield member toward said relaxed position, and latch means operative to maintain said shield member in said fully closed position.

2. In a vehicle having a body panel member with a wheel access opening therein, means for removably mounting a shield member on said panel member for closure of said access opening comprising a pair of support brackets each fixedly secured to a first of said members adjacent a respective edge portion thereof corresponding to a longitudinal end of said access opening and aligned on an axis of said first member, each of said brackets having a projection extending longitudinally of said first member; a pair of mounting elements each fixedly secured to the other of said members adjacent respective edge portions thereof corresponding to longitudinal ends of said access openings and having therein a slot defining a support surface and including one open end and a pair of generally parallel sides, each of said projections on said support brackets engageable with respective ones of said support surfaces in said slots to vertically position said shield member on said panel member for pivotal movement between a relaxed or tilted position relative to said access opening and a fully closed position in said access opening for closure thereof, each of said projections engageable at spaced locations thereon with said sides of respective ones of said slots to prevent free relative pivotal movement between said projections and said mounting elements during movement of said shield member to said fully closed position, forced pivotal movement of said shield member to said fully closed position operative to provide a rattle free support connection between said mounting elements and said support brackets and to impart a bias on said shield member toward said relaxed position thereof; and latch means operative to maintain said shield member in said fully closed position.

3. In a vehicle having a body panel member with a wheel access opening therein, an in-turned flange integral with said panel member and extending around said access opening, a pair of mounting elements each fixedly secured to said flange at respective longitudinal ends of said access opening and aligned on a generally horizontal line extending across said access opening, each of said mounting elements having therein a slot defining a support surface and including one open end and a pair of generally parallel sides, a shield member, a pair of support brackets each fixedly secured to said shield member at a respective longitudinal end thereof and including a flange portion extending longitudinally of said shield member, each of said flange portions engageable with a respective one of said slots on said support surface thereof to vertically position said shield member on said panel member for pivotal movement between a relaxed or tilted position relative to said access opening and a fully closed position in said access opening for closure thereof, each of said flange portions engageable at spaced locations thereon with opposite sides of said respective slots to prevent pivotal movement of said flanges relative to said mounting elements during pivotal movement of said shield member to said fully closed position, forced rotation of said shield member to said fully closed position operative to provide a rattle-free support connection between said mounting elements and said flange portions and to impart a bias on said shield member toward said relaxed position, a cam plate fixedly secured to said in-turned flange generally at the center of said access opening and including a detent notch therein, a web member fixedly secured to said shield member, a latch arm, and means mounting said latch arm on said web member generally centrally of said shield member for pivotal movement, a distal end of said latch arm in said fully closed position of said shield member being pivotable into engagement with said detent notch to releasably maintain said shield member in said fully closed position thereof.